(12) United States Patent
Kuwano

(10) Patent No.: US 8,957,904 B2
(45) Date of Patent: Feb. 17, 2015

(54) IMAGE PROCESSING APPARATUS, METHOD OF CONTROLLING THE SAME, AND STORAGE MEDIUM

(75) Inventor: Shunya Kuwano, Komae (JP)

(73) Assignee: Canon Kabushiki Kaisha, Tokyo (JP)

(*) Notice: Subject to any disclaimer, the term of this patent is extended or adjusted under 35 U.S.C. 154(b) by 253 days.

(21) Appl. No.: 13/585,351

(22) Filed: Aug. 14, 2012

(65) Prior Publication Data

US 2013/0207985 A1   Aug. 15, 2013

(30) Foreign Application Priority Data

Aug. 26, 2011  (JP) .................................. 2011-184759

(51) Int. Cl.
*G09G 5/39* (2006.01)
*G06T 1/60* (2006.01)
*H04N 1/00* (2006.01)

(52) U.S. Cl.
CPC .. *G06T 1/60* (2013.01); *H04N 1/00* (2013.01); *H04N 1/00408* (2013.01); *H04N 1/00482* (2013.01); *H04N 1/00517* (2013.01); *H04N 2201/0094* (2013.01)
USPC .......................................... 345/531; 345/530

(58) Field of Classification Search
CPC ................... G06T 1/60; G03G 15/50
USPC ...................... 345/531, 530; 399/83; 358/1.15
See application file for complete search history.

(56) References Cited

U.S. PATENT DOCUMENTS

| | | | | |
|---|---|---|---|---|
| 2007/0086022 A1* | 4/2007 | Kumagai | ....................... | 358/1.1 |
| 2008/0195663 A1* | 8/2008 | Sekine | ....................... | 707/104.1 |
| 2010/0315674 A1* | 12/2010 | Shimizu | ....................... | 358/1.15 |

FOREIGN PATENT DOCUMENTS

JP   2011-002506   1/2011

OTHER PUBLICATIONS

"Recent Jobs List on a Multifunction Device", disclosed anonymously, IP.com, No. IPCOM000143583D, Nov. 29, 2006.*

* cited by examiner

*Primary Examiner* — Jacinta M Crawford
(74) *Attorney, Agent, or Firm* — Carter, DeLuca, Farrell & Schmidt, LLP

(57) ABSTRACT

An image processing apparatus involving various settings, that allows a user to easily restore setting values after changing the setting values. Extracted difference in setting value indicating a difference between setting information at the time of execution of $n-1_{th}$ latest image processing (n: an integer from 1 to N) among N times of image processing (N: an integer not less than 2) and setting information after change of the setting value by the user is held in association with processing history of $n_{th}$ latest image processing. The held difference is used to restore the setting information stored in the storage unit to the setting information at the time of execution of $M_{th}$ latest image processing (M: an integer from 1 to N) if the processing history of the $M_{th}$ latest image processing among the processing histories user-selectably displayed on a display unit is selected by the user.

6 Claims, 8 Drawing Sheets

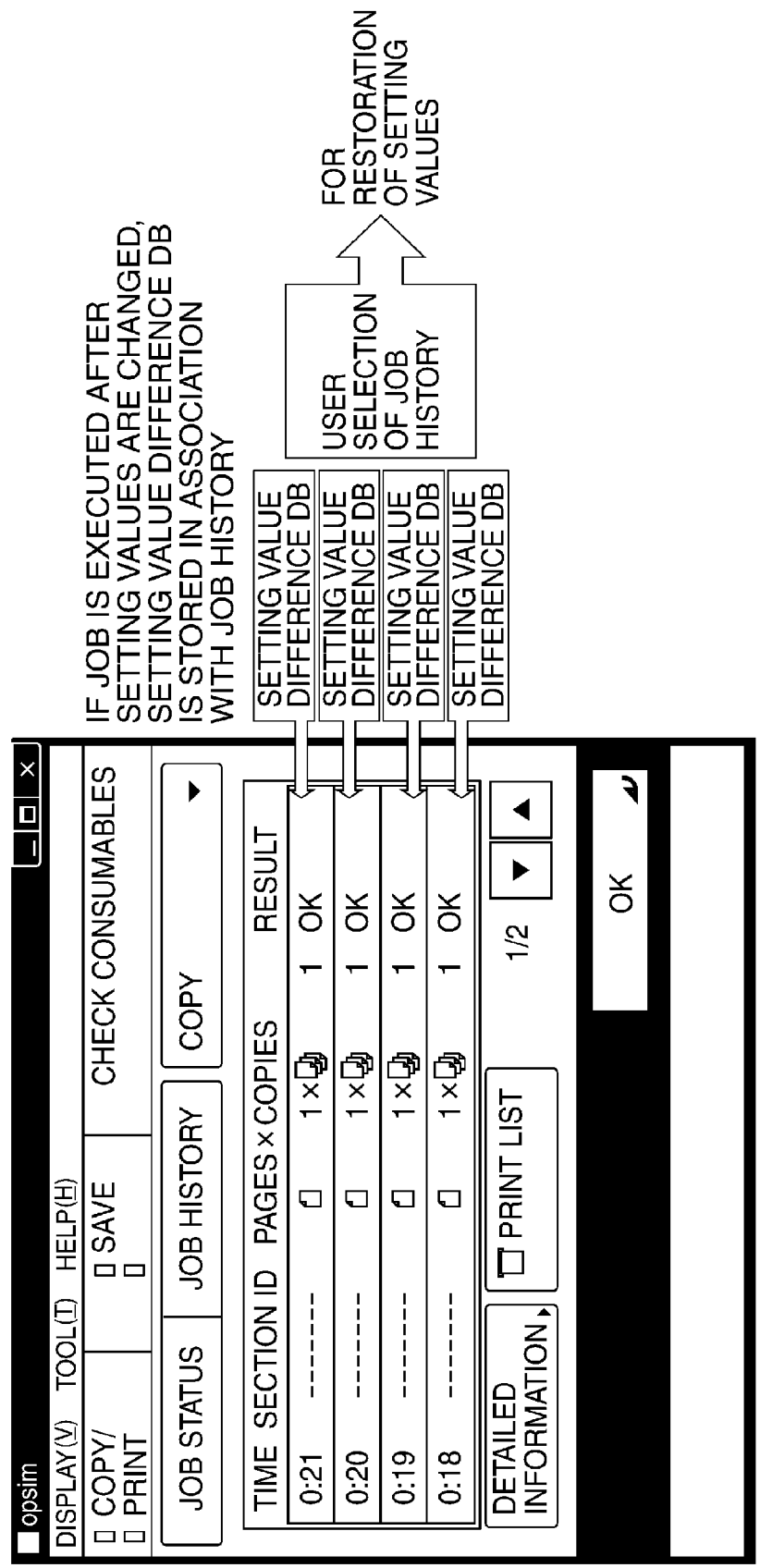

IMAGE PROCESSING APPARATUS, METHOD OF CONTROLLING THE SAME, AND STORAGE MEDIUM

BACKGROUND OF THE INVENTION

1. Field of the Invention

The present invention relates to an image processing apparatus, a method of controlling the same, and a storage medium, and more particularly, to an image processing apparatus involving various setting items, a method of controlling the same, and a storage medium.

2. Description of the Related Art

Recent multi-function peripherals (MFPs) tend to involve an increasing number of settings with the increase of functions, and complicated changes may be made in setting values of the settings with a user's arbitrary operations.

For example, when executing a copy job, the user may set setting values of various settings directly related to the job, such as settings for double-sided/single-sided, reduced-layout printing, and color/monochrome.

Further, there are a large number of settings for which the user may change the setting values at the time of executing the job, including setting values of settings not directly related to the job, such as a network setting and a language setting for a multi-function peripheral. When the user changes setting values of such a large number of settings, however, the user may set unintended values due to operation mistakes. As a result, the user may not be able to obtain a desired copy by executing the job.

One of approaches to addressing this problem is, when setting values for a print job are changed in execution of the job, to compare the setting values for the job with setting values for a past job stored in a history list and generate a setting value difference list (see Japanese Laid-Open Patent Publication (Kokai) No. 2011-2506, for example).

Unfortunately, the above one of approaches only extracts differences between setting values related to a print job and does not cover setting values not directly related to the print job (setting values related to settings such as a network setting and a language setting of a multi-function peripheral that executes the print job). In addition, the above one of approaches does not allow for restoration of the setting values not related to the print job.

Current multi-function peripherals are provided with many functions (such as copy, print, scanner, fax, and network functions). A user may set desired setting values for each of the functions while the functions coordinate with each other.

The user may perform operations of changing setting values for these functions and then execute a job. However, since these changing operations require complicated actions, executing the job may not necessarily produce an intended result. The user may then desire to undo the change of the setting values or make the setting values the same as used in past execution.

It is difficult to reproduce such complicated actions or past actions. Accordingly, fulfilling the above desire of the user requires undoing the change of all setting values used in executing the job in question or restoring the setting values to setting values used in the execution of a past specific job.

SUMMARY OF THE INVENTION

The present invention provides an image processing apparatus involving various settings, that allows a user to easily restore setting values of some of the various settings after changing the setting values, a method of controlling the same, and a storage medium.

In a first aspect of the present invention, there is provided an image processing apparatus comprising a storage unit adapted to store setting information about the image processing apparatus including a setting for which a setting value is changeable by a user, an execution unit adapted to execute N times of image processing (N: an integer not less than 2), an extraction unit adapted to extract, if $n_{th}$ latest image processing (n: an integer from 1 to N) has been executed by the execution unit after the setting value has been changed by the user, a difference in setting value indicating a difference between the setting information at the time of execution of $n-1_{th}$ latest image processing by the execution unit and the setting information after change of the setting value by the user, a generation unit adapted to generate processing history of the $n_{th}$ latest image processing when the $n_{th}$ latest image processing has been executed, a holding unit adapted to hold the difference in setting value extracted by the extraction unit in association with the processing history of the $n_{th}$ latest image processing generated by the generation unit, a display unit adapted to user-selectably display the processing histories generated by the generation unit, and a restoration unit adapted to restore the setting information stored in the storage unit to the setting information at the time of execution of $M_{th}$ latest image processing (M: an integer from 1 to N) by using the difference in setting value held by said holding unit if the processing history of the $M_{th}$ latest image processing is selected by the user through the display unit.

The present invention can provide an image processing apparatus involving various settings for which a user can change setting values, that allow a user to easily restore setting values of settings changed by the user, a method of controlling the same, and a storage medium.

The above and other objects, features, and advantages of the invention will become more apparent from the following detailed description taken in conjunction with the accompanying drawings.

BRIEF DESCRIPTION OF THE DRAWINGS

FIG. 8 is a diagram showing a display screen of a list of job history of past jobs.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Figure 1:
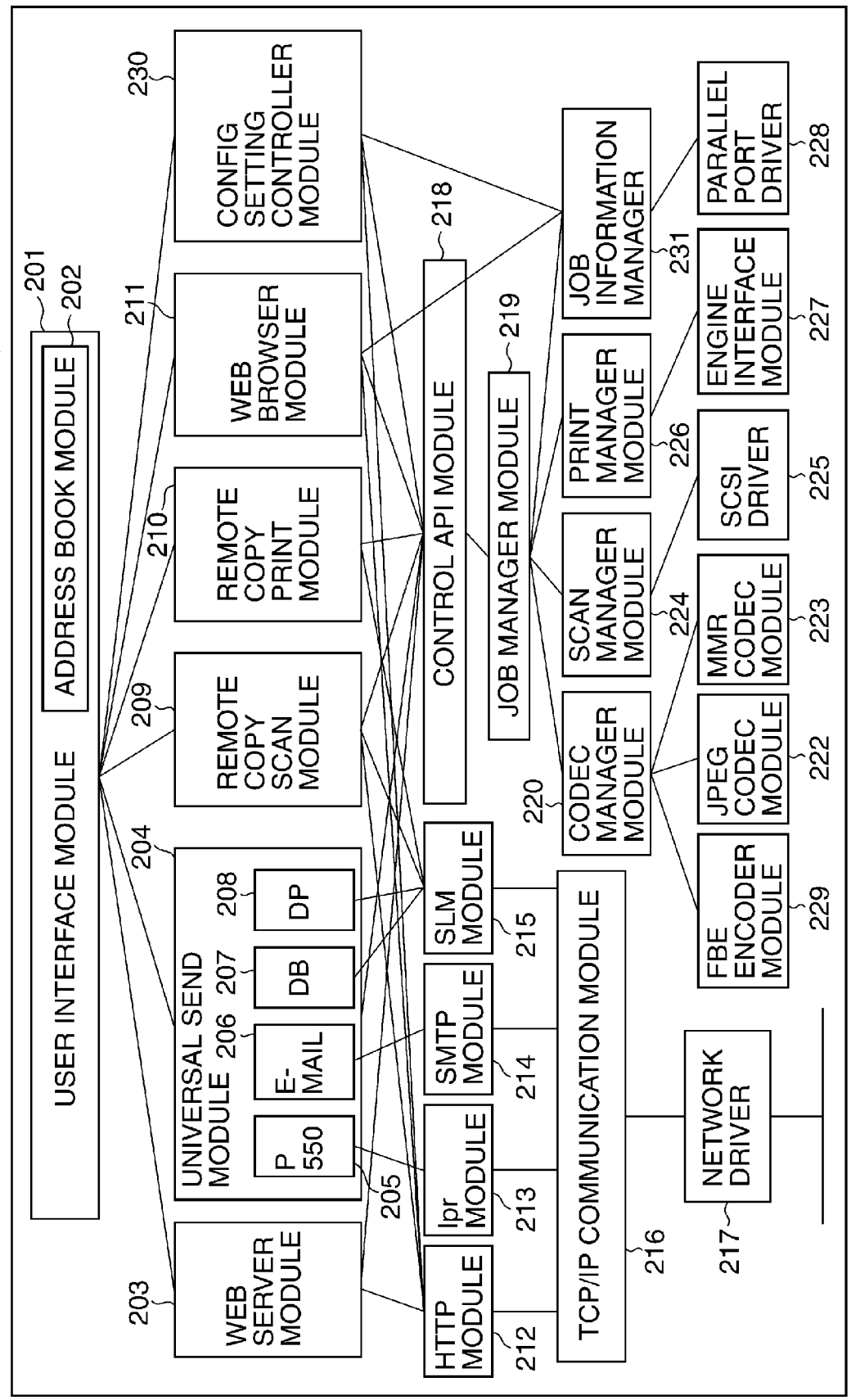
FIG. 1 is a diagram showing a software configuration of an image processing apparatus according to an embodiment of the present invention.

FIG. 1 is a diagram showing a software configuration of an image processing apparatus 100 according to an embodiment of the present invention. In this embodiment, a multi-function peripheral (MFP) that performs image input/output, image transmission/reception, and various image processing will be described as an example of the image processing apparatus 100.

In FIG. 1, the image processing apparatus 100 is provided with a user interface (hereinafter denoted as UI) module 201. The UI module 201 is a module that intermediates the image processing apparatus 100 and user operations when a user performs various operations and makes various settings for the image processing apparatus 100. The UI module 201 transfers input information to various modules of the image processing apparatus 100 (to be described below) to request processing or make data settings according to the user's operations.

An address book module 202 is a database module that manages destinations of data transmission and communication. Data managed by the address book module 202 may be added, deleted, and obtained by operations through the UI module 201. The address book module 202 also provides information about destinations of data transmission and communication to the modules of the image processing apparatus 100 (to be described below) according to the user's operations.

A web server module 203 provides management information about the image processing apparatus 100 to a web client in response to a request from the web client.

The management information is obtained via a universal send module 204, a remote copy scan module 209, a remote copy print module 210, and a control API module 218 (to be described below).

The management information is further provided to the web client via an HTTP module 212, a TCP/IP communication module 216, and a network driver 217 (to be described below).

A web browser module 211 reads information about various websites (homepages) on the Internet or an intranet and displays the websites. A detailed configuration of the web browser module 211 will be described below.

The universal send module 204 is a module responsible for data distribution. The universal send module 204 distributes data designated by the user through the UI module 201 to a similarly designated communication (output) destination.

Also, in response to the user's instruction to generate data to be distributed with the scanner function of the image processing apparatus 100, the universal send module 204 operates the apparatus via the control API module 218 to generate the data to be distributed.

The universal send module 204 further includes a P550 module 205, an e-mail module 206, a DB module 207, and a DP module 208.

The P550 module 205 is a module executed when a printer is designated as an output destination. The e-mail module 206 is a module executed when an e-mail address is designated as a communication destination. The DB module 207 is a module executed when a database is designated as an output destination. The DP module 208 is a module executed when an image processing apparatus similar to the image processing apparatus 100 is designated as an output destination.

The remote copy scan module 209 reads image information with the scanner function of the image processing apparatus 100 and outputs the read image information to another image processing apparatus connected via a network or the like. In this manner, the copy function implemented in the image processing apparatus 100 alone can be implemented using the other image processing apparatus.

The remote copy print module 210, with the printer function of the image processing apparatus 100, outputs image information obtained by another image processing apparatus connected via a network or the like. In this manner, the copy function implemented in the image processing apparatus 100 alone can be implemented using the other image processing apparatus.

A config setting controller module 230 uses a setting value DB (FIG. 4) (to be described below) to manage setting information about the image processing apparatus 100 changed with user operations through an operation unit 102 (FIG. 3) (to be described below). The config setting controller module 230 changes and updates setting values managed in the setting value DB according to user operations performed through the operation unit 102.

If a job is executed after setting values managed in the setting value DB are changed, a setting value difference database (hereinafter referred to as a "setting value difference DB") is stored in association with job history of the executed job through a job information manager 231 (to be described below). The setting value difference DB indicates differences in setting information managed in the setting value DB before and after the change, as will be described with reference to FIG. 4. When the setting values are restored, a user-selectable list of job history of past jobs is displayed on a display screen shown in FIG. 8. Upon the user's selection of job history of a past job from the list, the setting value difference DB associated with the user-selected job history of the past job is invoked through the job information manager 231, and the setting values managed in the setting value DB are restored to the setting values used at the time of execution of the user-selected past job.

The TCP/IP communication module 216 uses the network driver 217 to provide network communication functions to the above-described various modules. The network driver 217 controls portions physically connected to networks.

The HTTP module 212 is used when the image processing apparatus 100 performs HTTP communication. The HTTP module 212 uses the TCP/IP communication module 216 to provide communication functions to the web server module 203 and the web browser module 211.

The HTTP module 212 supports various web protocols including HTTP, and particularly provides communication functions based on secure protocols.

An lpr module 213 uses the TCP/IP communication module 216 to provide communication functions to the P550 module 205 in the universal send module 204.

An SMTP module 214 uses the TCP/IP communication module 216 to provide communication functions to the e-mail module 206 in the universal send module 204.

An SLM (salutation manager) module 215 uses the TCP/IP communication module 216 to provide communication functions to each of the DB module 207, the DP module 208, the remote copy scan module 209, and the remote copy print module 210.

The control API module 218 provides, to upstream modules such as the universal send module 204, interface to downstream modules such as a job manager module 219 (to be described below). This can reduce dependencies between the upstream modules and the downstream modules to enhance their versatility.

The job manager module 219 interprets various processes instructed by the above-described various modules via the control API module 218 and provides instructions to modules 220, 224, 226, and 231 (to be described below). The job manager module 219 also centrally manages hardware-based processes performed in the image processing apparatus 100.

A CODEC manager module 220 manages and controls various types of data compression and expansion among processes instructed by the job manager module 219.

An FBE encoder module 229 compresses data read in a scan process performed by the job manager module 219 and a scan manager module 224 (to be described below). The compression uses the FBE format.

A JPEG CODEC module 222 performs processes of JPEG compression of read data and JPEG expansion of print data. The data is read in a scan process performed by the job manager module 219 and the scan manager module 224, or in a print process performed by a print manager module 226.

An MMR CODEC module 223 performs processes of MMR compression of read data and MMR expansion of print data. The data is read in a scan process performed by the job manager module 219 and the scan manager module 224, or in a print process performed by the print manager module 226.

The scan manager module 224 manages and controls scan processes instructed by the job manager module 219. Communication between the scan manager module 224 and a scanner 103 (see FIG. 3) connecting to the image processing apparatus 100 is implemented via a SCSI driver 225.

The print manager module 226 manages and controls print processes instructed by the job manager module 219. Interface between the print manager module 226 and a printer 104 (see FIG. 3) connecting to the image processing apparatus 100 is provided by an engine interface module 227.

A parallel port driver 228 provides interface for outputting data to an output device (not shown) via a parallel port.

The job information manager 231 provides functions of storing and displaying job history of jobs executed in the past. As shown in FIG. 8, job history of each past job has associated therewith the setting value difference DB, which can be used to provide setting information about the image processing apparatus 100 used in the past job execution as necessary.

Figure 2:
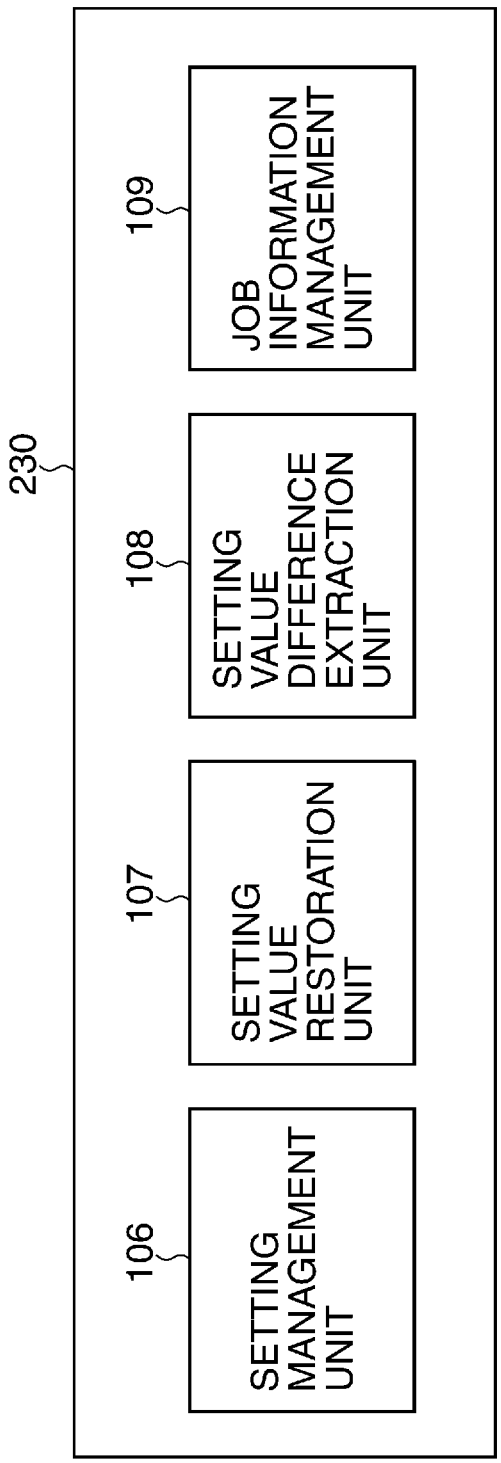
FIG. 2 is a diagram showing a detailed configuration of a config setting controller module in FIG. 1.

FIG. 2 is a diagram showing a detailed configuration of the config setting controller module 230 in FIG. 1.

A setting management unit 106 manages setting information about the image processing apparatus 100 on the basis of the setting value DB. The setting value DB corresponds to setting information about the image processing apparatus 100 including settings for which the user can change their setting values. If setting values managed in the setting value DB have been changed immediately before execution of a job, a setting value difference extraction unit 108 extracts differences between before and after the change of the setting values of the setting information on the basis of time information about the change, and generates the setting value difference DB indicating the extracted differences.

The setting value difference DB is stored by a job information management unit 109 in association with job history of the job after the job is executed.

The user can browse a list of job histories of all the past jobs on a display screen shown in FIG. 8. The user only needs to select job history of a past job from the list according to the user's purpose to thereby cause a setting value restoration unit 107 to restore setting information managed in the setting value DB to the setting information used at the time of execution of the user-selected past job.

Figure 3:
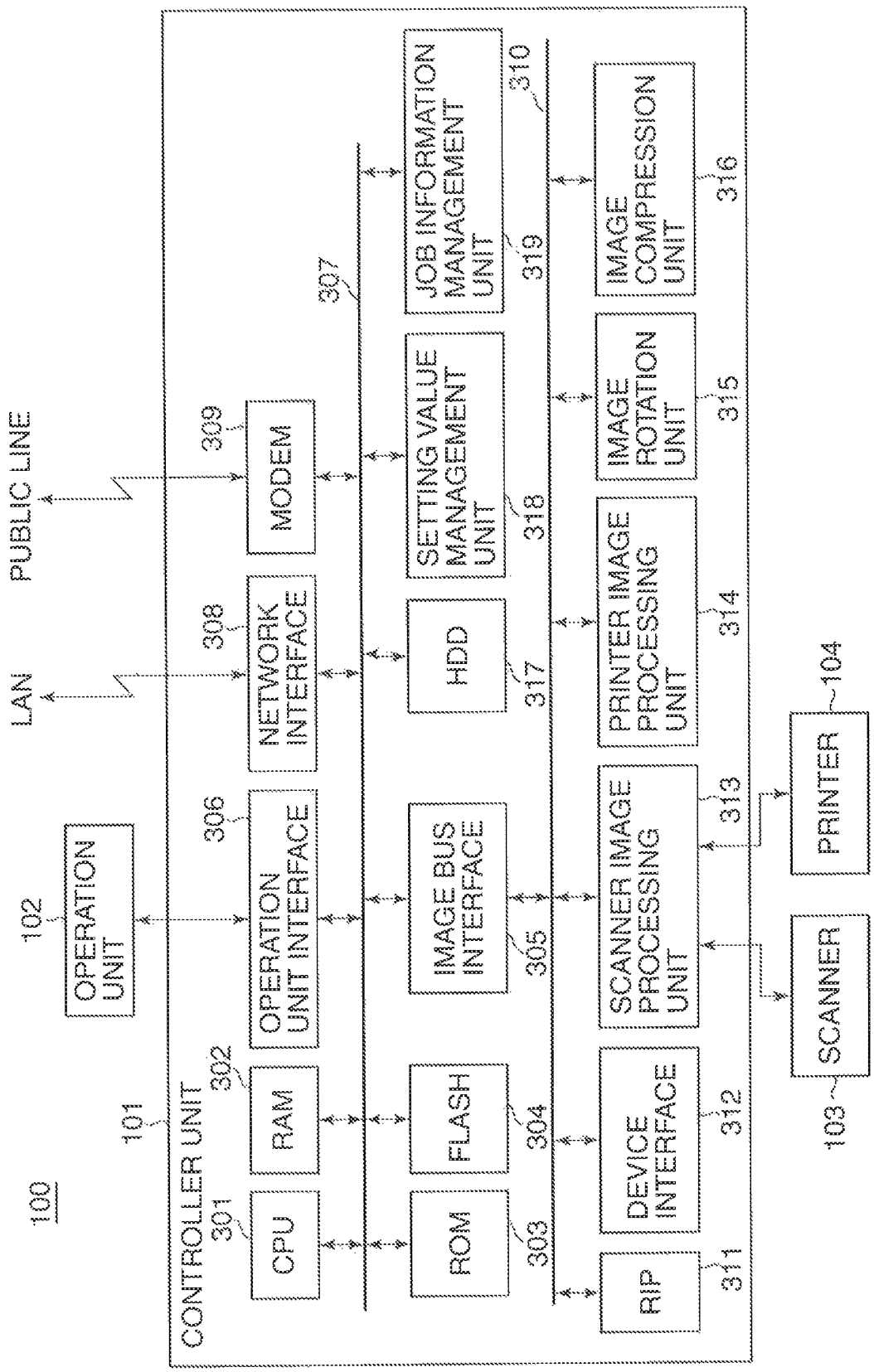
FIG. 3 is a diagram showing a hardware configuration of the image processing apparatus in FIG. 1.

FIG. 3 is a diagram showing a hardware configuration of the image processing apparatus 100 in FIG. 1.

In FIG. 3, a controller unit 101 connects with and controls a scanner 103, a printer 104, and an operation unit 102. The controller unit 101 is also connected with a LAN and a public line, via which the controller unit 101 inputs and outputs image information and device information.

A CPU 301 is connected with a RAM 302, a ROM 303, a flash memory 304, an image bus interface 305, an operation unit interface 306, a network interface 308, and a modem 309 via a system bus 307. The CPU 301 is further connected with an HDD 317, a setting value management unit 318, and a job information management unit 319. The CPU 301 executes the modules shown in FIGS. 1 and 2.

The RAM 302 is a memory for providing a work area for the CPU 301 and is also used as image memory for temporarily storing image data. The ROM 303 is a boot ROM and stores a boot program for the system. The flash memory 304 stores system software, current setting information about the image processing apparatus 100, and the like.

The operation unit interface 306 is an interface for input and output to and from the operation unit 102. The operation unit interface 306 serves to output image data to be displayed on the operation unit 102 to the operation unit 102 and to transfer information input by the user through the operation unit 102 to the CPU 301.

The network interface 308 is connected with the LAN to input and output information to and from the LAN. The modem 309 is connected with the public line to input and output information to and from the public line.

The image bus interface 305 is a bus bridge connecting the system bus 307 and an image bus 310 that transfers image data at a high speed, and converting data structures.

The HDD 317 is a user-detachable unit and holds image data, address book data, history information about past jobs, and the like. The HDD 317 is also a storage unit that stores the above-described setting value DB and setting value difference DB. The HDD 317 also stores the modules shown in FIGS. 1 and 2.

The setting value management unit 318 stores and restores setting values changed with user operations through the operation unit 102, and extracts differences between setting values before and after the execution of a job. The job information management unit 319 is a module that stores and displays job history of past jobs and can store, as the setting value difference DB, the differences extracted by the setting value management unit 318. The setting value management unit 318 can restore setting information managed in the setting value DB to setting information managed in the setting value DB at the time of past job execution by using the setting value difference DB stored by the job information management unit 319.

Connected to the image bus 310 are an RIP (Raster Image Processor) 311, a device interface 312, a scanner image processing unit 313, a printer image processing unit 314, an image rotation unit 315, and an image compression unit 316.

The RIP 311 converts PDL code received from the LAN into a bitmap image. The device interface 312 connects the scanner 103 and the printer 104 to the controller unit 101 and performs synchronously or asynchronously conversion of image data.

The scanner image processing unit 313 performs operations such as correction, processing, and edition for input image data. The printer image processing unit 314 performs operations such as printer correction and resolution conversion for image data to be printed out. The image rotation unit 315 rotates image data. The image compression unit 316 performs JPEG compression/expansion processes for multi-valued image data, and performs JBIG, MMR, or MH compression/expansion processes for binary image data.

Figure 4:
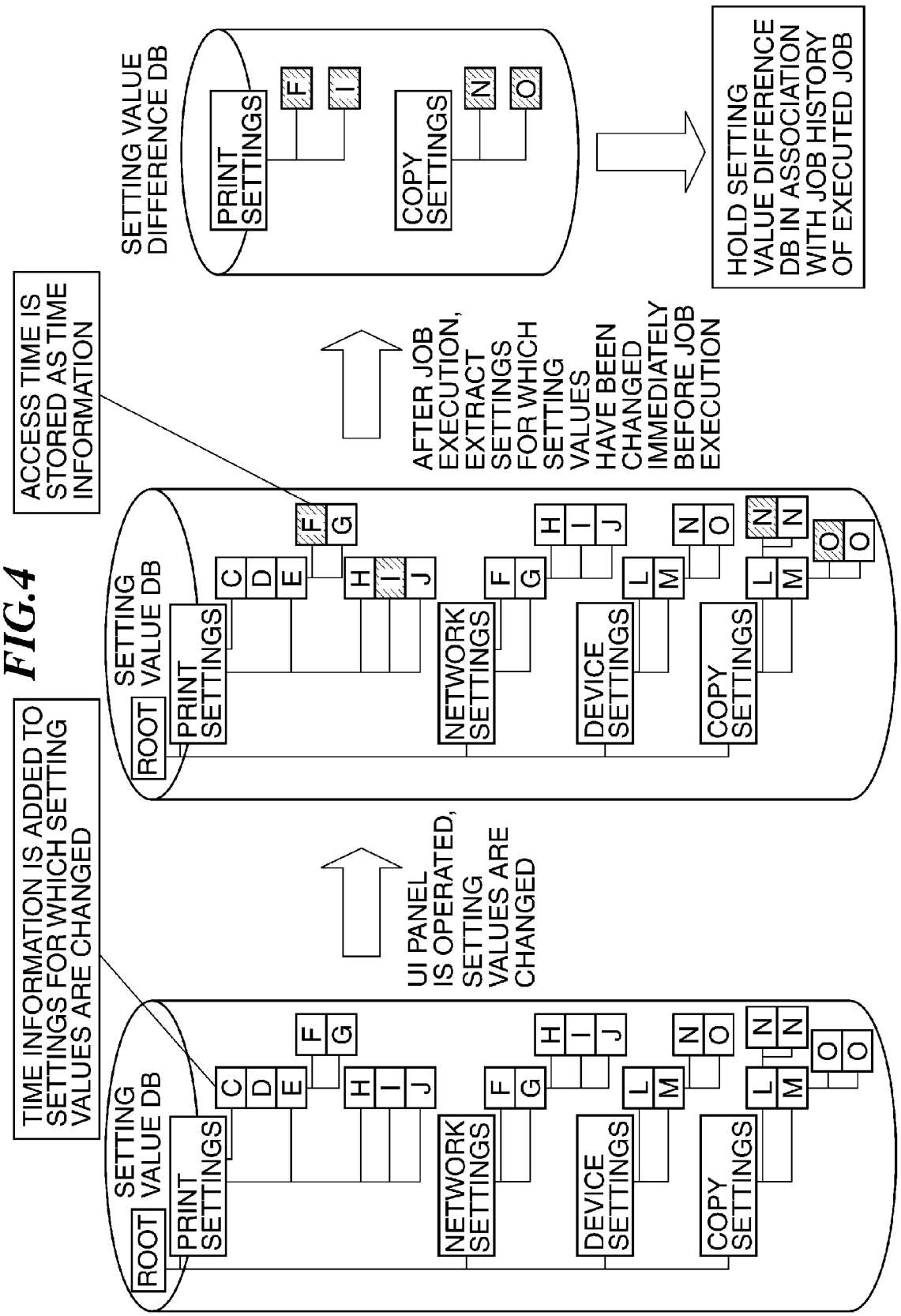
FIG. 4 is a diagram showing a process in which a setting value difference extraction unit in FIG. 2 generates a setting value difference DB.

FIG. 4 is a diagram showing a process in which the setting value difference extraction unit 108 in FIG. 2 generates the setting value difference DB.

FIG. 4 shows, from left, a setting value DB before change, the setting value DB after the change, and a setting value difference DB.

The setting value DB include various setting items such as "Print Settings", "Network Settings", "Device Settings", and "Copy Settings" which are located below "root". Thus, the image processing apparatus 100 has various setting items. These setting items are not setting items for a job executed by the image processing apparatus 100 but setting items for the image processing apparatus 100 itself.

Each item has several settings. For example, "Print Settings" has eight settings, C, D, E, F, G, H, I, and J.

Thus, the setting value DB has settings for each item written therein. If a setting value of a setting in the setting value DB is changed, time information is added to the setting. The time information indicates the time at which the setting value was changed.

If the user changes setting values managed in the setting value DB by performing operations on the operation unit 102, such as on a UI panel thereof, the setting value DB turns to the one shown in the middle in FIG. 4. In the setting value DB shown in the middle in FIG. 4, shaded blocks indicate settings for which their setting values have been changed. Since setting values are changed by accessing the setting value DB, the time information to be added indicates the access time, which is then stored. For the changed settings, the setting value DB stores and manages the setting values immediately before the change in addition to the setting values after the change.

If a job is executed after the change of the setting values, the settings for which their setting values have been changed are extracted as the setting value difference DB, among the settings managed in the setting value DB. Specifically, F and I of "Print Settings" and N and O of "Copy Settings" are extracted. The setting value difference DB, generated by extracting the settings in this manner, is recorded in association with job history of the job executed immediately after the change of the setting values. For the changed settings, the setting values before and after the change are recorded in the setting value difference DB.

Figure 5:
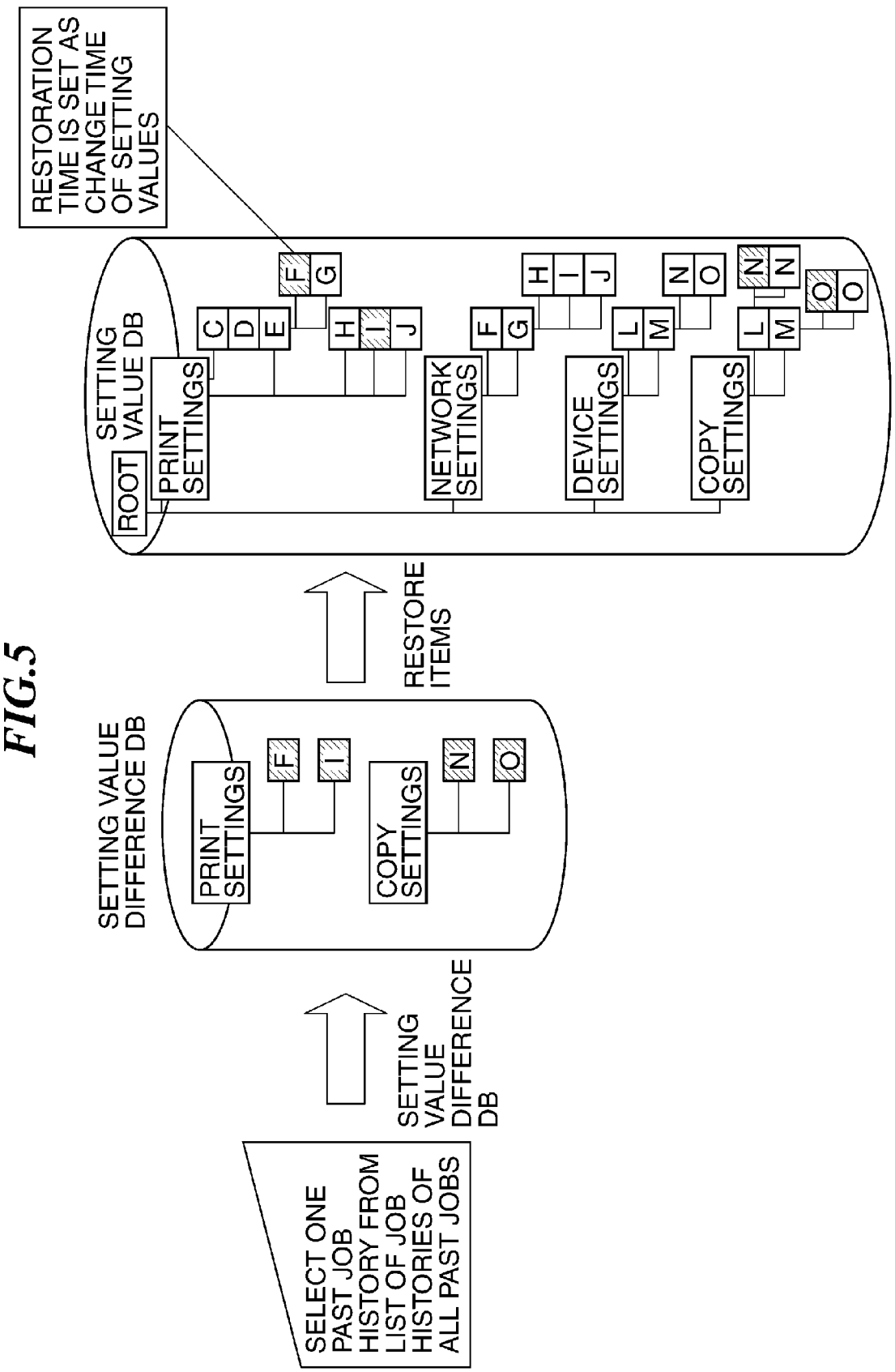
FIG. 5 is a diagram showing a process in which a setting value restoration unit in FIG. 2 restores a setting value DB using the setting value difference DB.

FIG. 5 is a diagram showing a process in which the setting value restoration unit 107 in FIG. 2 restores the setting value DB using the setting value difference DB.

FIG. 5 shows, from left, a setting value difference DB and a restored setting value DB.

As described above, job history of each past job has the setting value difference DB associated therewith. Accordingly, the user can browse a job history list of past jobs on the display screen shown in FIG. 8 and select job history of a past job from the list to obtain the setting value difference DB associated with the selected job history of the past job. With the setting value difference DB, only settings in the setting value DB corresponding to setting values recorded in the setting value difference DB among settings stored in the setting value DB needs to be overwritten with the setting values in the setting value difference DB. Thus, setting information managed in the setting value DB can be restored to setting information used in the past execution of the job of the selected job history. At this point, the time information about the restored settings is updated to the time of the restoration of the settings.

Figure 6:
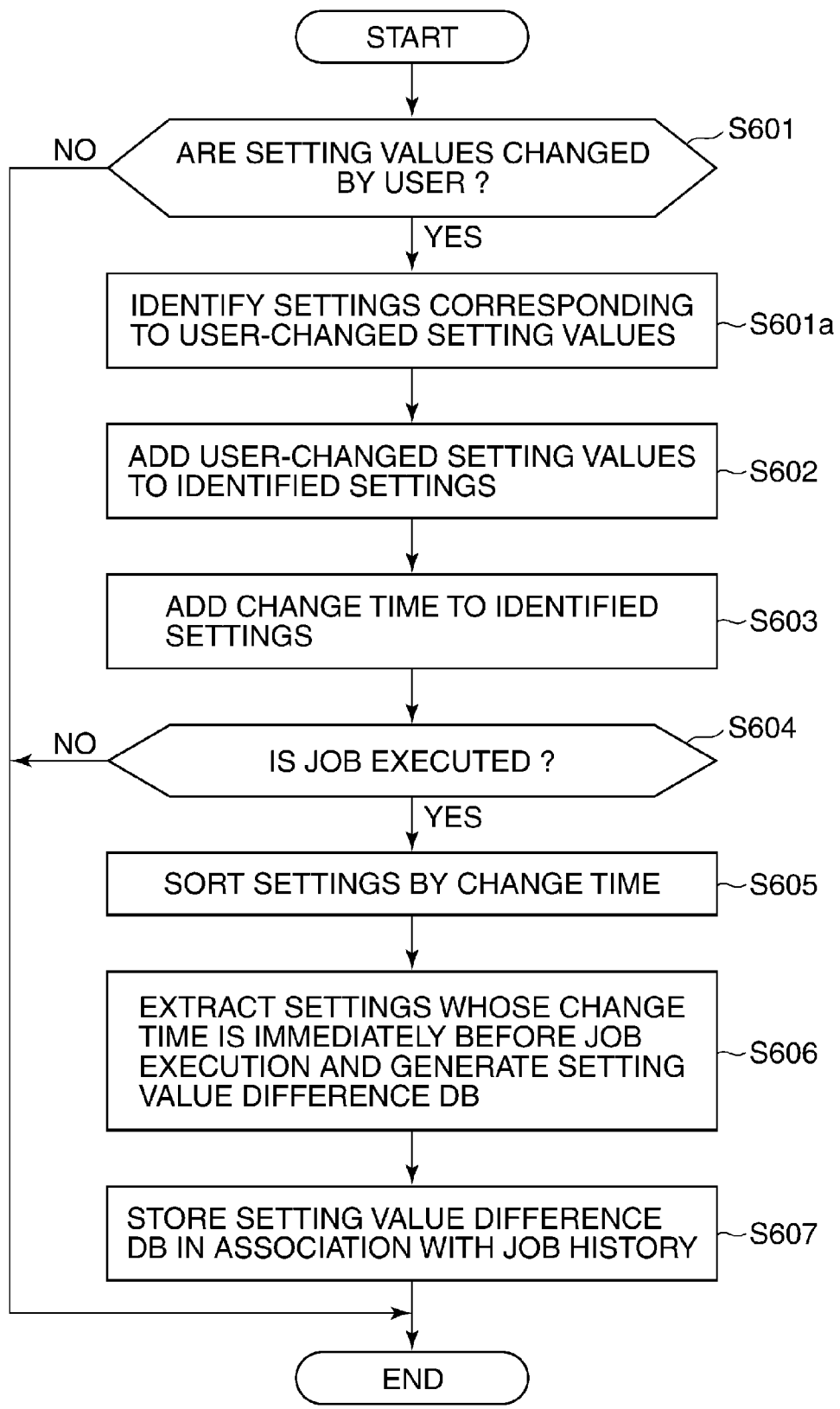
FIG. 6 is a flowchart showing a procedure of a history storage process performed by a CPU in FIG. 3.

FIG. 6 is a flowchart showing a procedure of a history storage process performed by the CPU 301 in FIG. 3.

In FIG. 6, it is determined whether or not setting values managed in the setting value DB are changed by the user with the operation unit 102 (step S601). If it is determined in step S601 that no setting values are changed (NO in step S601), the process terminates.

If it is determined in step S601 that setting values are changed by the user (YES in step S601), settings managed in the setting value management DB corresponding to the user-changed setting values are identified (step S601a). Then the user-changed setting values are added to the identified settings (step S602). That is, through the process in step S602, the setting values after the change by the user are stored for the settings identified in step S601a in addition to the setting values before the change by the user, i.e., the setting values in preceding job execution.

Thereafter, time information indicating the time of changing the setting values by the user is added to the identified settings in the setting value DB (step S603).

It is then determined whether or not a job is executed in step S604. If it is determined in step S604 that a job is not executed (NO in step S604), the process terminates.

If it is determined in step S604 that a job is executed (YES in step S604), the settings managed in the setting value DB are sorted by change time indicated by the time information (step S605). Settings whose change time is immediately before the execution of the job are extracted from the setting value DB to generate the setting value difference DB (step S606). The step S606 corresponds to an extraction unit such that, if setting values are changed by the user (YES in step S601) and then the present job (present image processing) is executed (YES in step S604), the extraction unit extracts differences in setting values indicating differences between the setting information at the preceding job (preceding image processing) execution (i.e., the setting information about the image processing apparatus 100 before the setting values are changed by the user at step S601) and the setting information about the image processing apparatus 100 after the setting values are changed by the user at step S601. In step S605, the time information added in step S603 is used to sort the settings managed in the setting value DB.

Thereafter, the setting value difference DB generated in step S606 is stored in association with a job history of the job executed in step S604 (step S607). Then the process terminates. The step S607 corresponds to a holding unit that holds the extracted differences in setting values in association with processing history of the present image processing.

If the setting values are changed by a predetermined user in step S601, the differences in setting values may not be extracted in step S606. For example, this may be realized in the following manner. The user may be required to log in to the image processing apparatus 100 in order to change setting values in step S601. When it is determined that the user who has logged in is a user corresponding to e.g., a system manager from login information about the user, the setting values changed by the user in step S601 may not be extracted.

Figure 7:
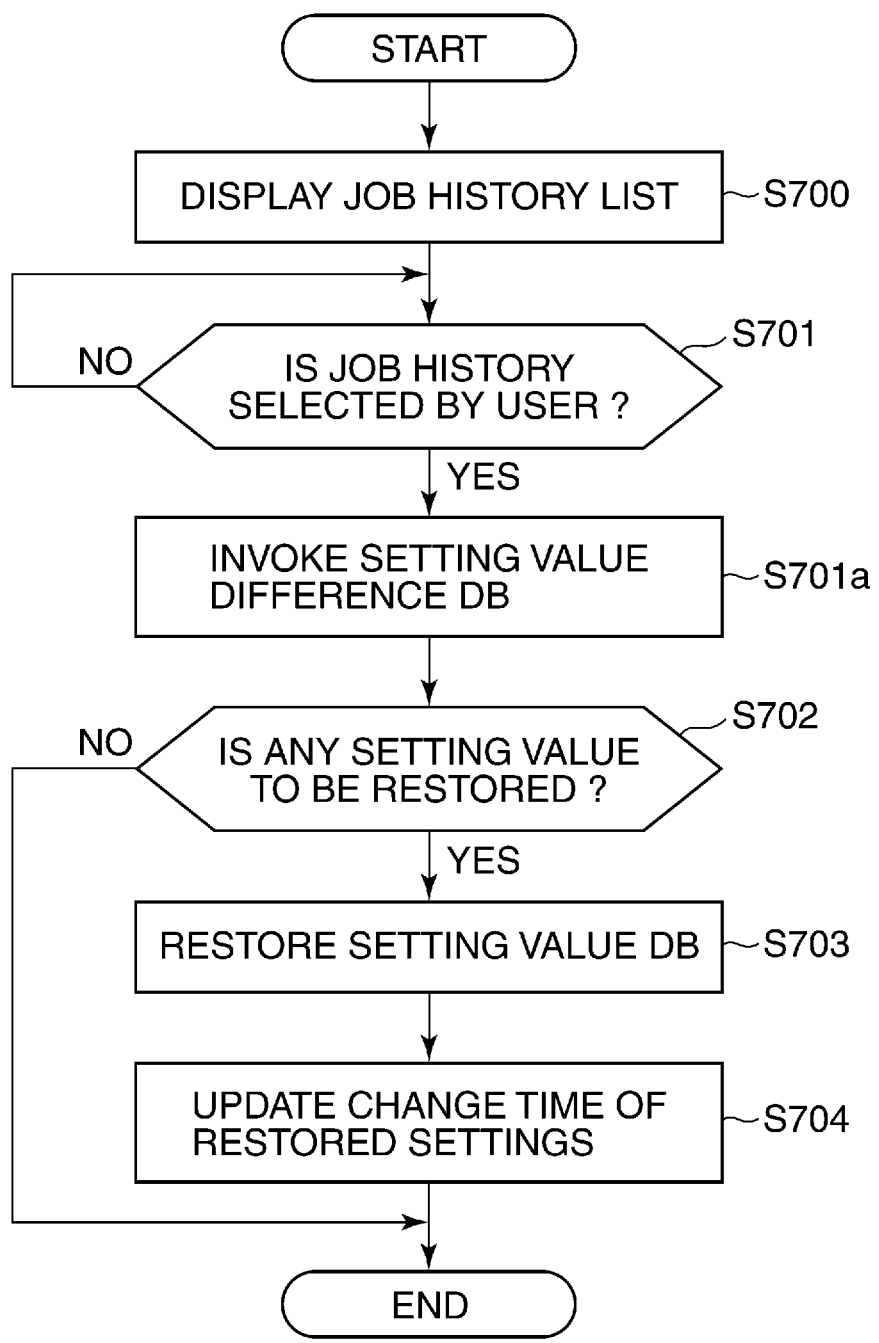
FIG. 7 is a flowchart showing a procedure of a restoration process performed by the CPU in FIG. 3.

FIG. 7 is a flowchart showing a procedure of a restoration process performed by the CPU 301 in FIG. 3.

In FIG. 7, a display screen of a list of job history of past jobs (FIG. 8) is displayed (step S700). Upon receiving user's selection of the job history of a past job selected from the list of the job history of the past jobs (YES in step S701), the setting value difference DB recorded in association with the user-selected job history of the past job is invoked (step S701a). With reference to the invoked setting value difference DB, it is determined whether or not any setting value is to be restored in the setting values currently managed in the setting value DB (step S702). For example, if the setting value difference DB in FIG. 4 is invoked in step S701a and if a setting value before the change recorded for the setting F in the setting value difference DB is different from a setting value after the change recorded for the setting F in the setting value DB, it is determined in step S702 that there exists the setting value to be restored (that is, the setting value of the setting F).

If it is determined in step S702 that no setting values are to be restored (NO in step S702), the process terminates.

If it is determined in step S702 that any setting value is to be restored (YES in step S702), the setting value DB is restored using setting values after the change recorded for the setting in the setting value difference DB (step S703). The time information (change time) about the restored settings is updated (step S704), and the process terminates. The step S703 corresponds to a restoration unit that restores, if the job history of the past job is selected by the user (YES in step S701), the setting value DB (setting information) stored in the HDD 317 (storage unit) by using each setting value difference DB (setting value difference) held in association with the job history of each job executed after the past job corresponding to the job history selected by the user. A list of differences in the setting DB before and after the restoration may be displayed.

It should be noted that if the list shown in FIG. 8 includes N job histories (N: an integer not less than 2), the user can select a job history of $M_{th}$ latest job (M: an integer from 1 to N). In that case, the setting value DB is restored in step S703 by tracing a plurality of job histories from the job history of the latest job to the job history of M$-1_{th}$ latest job sequentially.

For example, when the user selects a job history of a job executed at 0:19 from the list shown in FIG. 8, the setting value DB is restored through the following procedures. Firstly, among setting values managed by the setting value DB presently stored in the HDD 317, setting values stored as the setting values after the change in the setting value difference DB associated with a job history of a job executed at 0:21 is restored to the setting values immediately before the change. Thus, the setting value DB is restored to a state as of 0:20 when a second latest job is executed. Secondly, among setting values managed by the setting value DB restored to the state as of 0:20, setting values stored as the setting values after the change in the setting value difference DB associated with a job history of a job executed at 0:20 is restored to the setting values immediately before the change. Thus, the setting value DB is restored to a state as of 0:19 when a third latest job is executed.

Accordingly, when a job history of the $M_{th}$ latest job is selected by the user, the setting value DB presently stored in HDD 317 can be restored to a state as of the timing when the $M_{th}$ latest job is executed, by using all the setting value difference DB from the setting value difference DB associated with the job history of the latest job to the setting value difference DB associated with the job history of the M$-1_{th}$ latest job.

According to the processes in FIGS. 6 and 7, if a present job is executed after the user changes setting values managed in the setting value DB, differences between setting information in the setting value DB at the time of preceding job execution and setting information after the change by the user are extracted (step S606). The setting value difference DB indicating the extracted differences is held in association with job history of the present job (step S609). The setting information managed in the setting value DB stored in the HDD 317 can be restored to the setting information at the time of past job execution using the held setting value difference DB. As a result, in the image processing apparatus involving various settings, setting values managed in the setting value DB can be easily restored to setting values set by the user in the past.

In this embodiment, the setting value difference DB indicating the differences between setting values before and after the change by the user is recorded in association with job history of a job after execution of the job. However, the invention is not limited thereto. For example, the setting value DB, before and after the change by the user, itself may be recorded in association with job history of a job after execution of the job.

In the above-described embodiment, the time information for the setting value DB is updated if setting values managed in the setting value DB are changed by the user. However, similar mechanism may be realized by providing a flag for each setting managed in the setting value DB. In this case, when the setting value difference DB associated with job history of a past job is used to restore the setting value DB, the setting value DB can be restored with reference to the flag corresponding to the time information in a manner similar to the case of using the time information.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-184759, filed Aug. 26, 2011, which is hereby incorporated by reference herein in its entirety.

What is claimed is:

1. An image processing apparatus comprising:
 a storage unit adapted to store setting information about the image processing apparatus including a setting for which a setting value is changeable by a user;
 an execution unit adapted to execute N times of image processing (N: an integer not less than 2);
 an extraction unit adapted to extract, if $n_{th}$ latest image processing (n: an integer from 1 to N) has been executed by said execution unit after the setting value has been changed by the user, a difference in setting value indicating a difference between the setting information at the time of execution of n$-1_{th}$ latest image processing by said execution unit and the setting information after change of the setting value by the user;
 a generation unit adapted to generate processing history of the $n_{th}$ latest image processing when the $n_{th}$ latest image processing has been executed;
 a holding unit adapted to hold the difference in setting value extracted by said extraction unit in association with the processing history of the $n_{th}$ latest image processing generated by said generation unit;
 a display unit adapted to user-selectably display the processing histories generated by said generation unit; and a restoration unit adapted to restore the setting information stored in said storage unit to the setting information at the time of execution of $M_{th}$ latest image processing (M: an integer from 1 to N) by using the difference in setting value held by said holding unit if the processing history of the $M_{th}$ latest image processing is selected by the user through said display unit.

2. The image processing apparatus according to claim 1, wherein time information indicating the time of the change of the setting value by the user is added to the setting information, and said extraction unit uses the time information to extract the difference in setting value.

3. The image processing apparatus according to claim 1, wherein a list of differences in setting information before and after restoration by said restoration unit is displayed.

4. The image processing apparatus according to claim 1, wherein said extraction unit disables extraction of the difference in setting value if the user who has changed the setting value is a predetermined user.

5. A method of controlling an image processing apparatus, comprising:

storing, in a storage unit, setting information about the image processing apparatus including a setting for which a setting value is changeable by a user;

executing N times of image processing (N: an integer not less than 2);

extracting, if $n_{th}$ latest image processing (n: an integer from 1 to N) has been executed after the setting value has been changed by the user, a difference in setting value indicating a difference between the setting information at the time of execution of $n-1_{th}$ latest image processing and the setting information after change of the setting value by the user;

generating processing history of the $n_{th}$ latest image processing when the $n_{th}$ latest image processing has been executed;

holding the extracted difference in setting value in association with the processing history of the $n_{th}$ latest image processing;

user-selectably displaying, on a display unit, the generated processing histories; and restoring the setting information stored in the storage unit to the setting information at the time of execution of $M_{th}$ latest image processing (M: an integer from 1 to N) by using the held difference in setting value if the processing history of the $M_{th}$ latest image processing is selected by the user through the display unit.

6. A non-transitory computer-readable storage medium having stored therein a program for causing a computer to implement a method of controlling an image processing apparatus, the method comprising:

storing, in a storage unit, setting information about the image processing apparatus including a setting for which a setting value is changeable by a user;

executing N times of image processing (N: an integer not less than 2);

extracting, if $n_{th}$ latest image processing (n: an integer from 1 to N) has been executed after the setting value has been changed by the user, a difference in setting value indicating a difference between the setting information at the time of execution of $n-1_{th}$ latest image processing and the setting information after change of the setting value by the user;

generating processing history of the $n_{th}$ latest image processing when the $n_{th}$ latest image processing has been executed;

holding the extracted difference in setting value in association with the processing history of the $n_{th}$ latest image processing;

user-selectably displaying, on a display unit, the generated processing histories; and restoring the setting information stored in the storage unit to the setting information at the time of execution of $M_{th}$ latest image processing (M: an integer from 1 to N) by using the held difference in setting value if the processing history of the $M_{th}$ latest image processing is selected by the user through the display unit.

* * * * *